(12) United States Patent
Wu et al.

(10) Patent No.: US 9,724,675 B2
(45) Date of Patent: Aug. 8, 2017

(54) PHOTOCATALYST MATERIAL AND METHOD FOR FABRICATING THE SAME

(71) Applicant: Industrial Technology Research Institute, Hsinchu (TW)

(72) Inventors: Jyh Ming Wu, Taichung (TW); Lu-Chih Wang, New Taipei (TW); Hong-Ching Lin, Kaohsiung (TW); Hsin-Hsien Yeh, Taichung (TW); Wei-Tsung Kao, Kaohsiung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 224 days.

(21) Appl. No.: 14/069,988

(22) Filed: Nov. 1, 2013

(65) Prior Publication Data
US 2014/0141968 A1    May 22, 2014

Related U.S. Application Data

(60) Provisional application No. 61/721,739, filed on Nov. 2, 2012.

(30) Foreign Application Priority Data

Oct. 21, 2013   (TW) .............. 102137866 A (51) Int. Cl.
*B01J 23/80* (2006.01)
*B01D 53/88* (2006.01)
(Continued)

(52) U.S. Cl.
CPC ............ *B01J 23/80* (2013.01); *B01D 53/885* (2013.01); *B01J 23/06* (2013.01); *B01J 23/60* (2013.01);
(Continued)

(58) Field of Classification Search
CPC ... B01J 23/80; B01J 23/06; B01J 23/60; B01J 23/66; B01J 35/0013; B01J 35/004; B01J 37/0219; B01J 37/345; B01D 53/885
See application file for complete search history.

(56) References Cited

U.S. PATENT DOCUMENTS 5,755,867 A   5/1998  Chikuni et al.
5,853,866 A   12/1998  Watanabe et al.
(Continued)

FOREIGN PATENT DOCUMENTS

CN   1929912 A   3/2007
CN   1962054 A   5/2007
(Continued)

OTHER PUBLICATIONS

Zeferino et al (Photoluminescence and Raman Scattering in Ag-doped ZnO Nanoparticles, J Appl Phys, 109, (2011), 014308).*
(Continued)

*Primary Examiner* — Melvin C Mayes
*Assistant Examiner* — Michael Forrest
(74) *Attorney, Agent, or Firm* — Muncy, Geissler, Olds & Lowe, P.C.

(57) ABSTRACT

The disclosure provides a photocatalyst material and a method for fabricating the same. The photocatalyst material includes a zinc oxide material doped with metal, wherein the zinc oxide material has a lattice structure including a plurality of defects. A part of the defects are filled with a metal.

17 Claims, 6 Drawing Sheets

(51) Int. Cl.

| | | |
|---|---|---|
| B01J 35/00 | (2006.01) | |
| B01J 23/60 | (2006.01) | |
| B01J 37/02 | (2006.01) | |
| B01J 37/34 | (2006.01) | |
| B01J 23/66 | (2006.01) | |
| B01J 37/08 | (2006.01) | |
| B01J 23/06 | (2006.01) | |

(52) U.S. Cl.
CPC ............. *B01J 23/66* (2013.01); *B01J 35/004* (2013.01); *B01J 35/0013* (2013.01); *B01J 37/0219* (2013.01); *B01J 37/345* (2013.01); *B01D 2255/104* (2013.01); *B01D 2255/20761* (2013.01); *B01D 2255/20792* (2013.01); *B01D 2255/802* (2013.01); *B01D 2257/90* (2013.01); *B01D 2258/06* (2013.01); *B01D 2259/802* (2013.01); *B01D 2259/804* (2013.01); *B01J 37/08* (2013.01)

(56) References Cited

U.S. PATENT DOCUMENTS

| | | | |
|---|---|---|---|
| 6,135,838 | A | 10/2000 | Wang |
| 6,791,257 | B1 | 9/2004 | Sato et al. |
| 7,666,385 | B2 | 2/2010 | Liao et al. |
| 2001/0036897 | A1 | 11/2001 | Tsujimichi et al. |
| 2002/0016250 | A1 | 2/2002 | Hayakawa et al. |
| 2004/0226813 | A1 | 11/2004 | Wang |
| 2005/0248255 | A1 | 11/2005 | Chen |
| 2006/0140827 | A1 | 6/2006 | Cheng et al. |
| 2006/0266258 | A1 | 11/2006 | Asakura et al. |
| 2006/0283701 | A1 | 12/2006 | Li et al. |
| 2007/0184975 | A1 | 8/2007 | Yi et al. |
| 2008/0020927 | A1 | 1/2008 | Cheng et al. |
| 2008/0199611 | A1 | 8/2008 | Liou et al. |
| 2008/0308405 | A1 | 12/2008 | Yu et al. |
| 2009/0061267 | A1 | 3/2009 | Monzyk et al. |
| 2009/0110623 | A1 | 4/2009 | Wen et al. |
| 2009/0136389 | A1 | 5/2009 | Park |
| 2009/0170693 | A1 | 7/2009 | Ikeda |
| 2009/0318046 | A1 | 12/2009 | Liou et al. |
| 2010/0050469 | A1 | 3/2010 | Chen |
| 2010/0167914 | A1 | 7/2010 | Anderson et al. |
| 2011/0053285 | A1 | 3/2011 | Jeon et al. |
| 2011/0207006 | A1 | 8/2011 | Lee et al. |
| 2012/0111801 | A1 | 5/2012 | Yi et al. |
| 2012/0118318 | A1 | 5/2012 | Hillebrandt Poulsen et al. |
| 2012/0175585 | A1 | 7/2012 | Banin et al. |
| 2012/0178619 | A1 | 7/2012 | Ji et al. |

FOREIGN PATENT DOCUMENTS

| | | |
|---|---|---|
| CN | 100427204 C | 10/2008 |
| CN | 1772375 A | 6/2009 |
| CN | 100493696 C | 6/2009 |
| CN | 101480624 A | 7/2009 |
| CN | 102218315 A | 10/2011 |
| JP | 11-169726 A | 6/1999 |
| JP | 2000-33646 A | 2/2000 |
| JP | 2003-340289 A | 12/2003 |
| TW | I289064 B | 11/2007 |
| TW | I315332 | 10/2009 |
| TW | I404562 B1 | 8/2013 |
| WO | WO 2006/004248 A1 | 1/2006 |

OTHER PUBLICATIONS

Jyh Ming Wu et al., "Rapidly synthesized ZnO nanowires by ultraviolet decomposition process in ambient air for flexible photodetector", Nanoscale, 2011, 3, pp. 1053-1058.

Chungui Tian et al., "One pot synthesis of Ag nanoparticle modified ZnO microspheres in ethylene glycol medium and their enhanced photocatalytic performance", Journal of Solid State chemistry 183, 2010, pp. 2720-2725.

Chunlei Ren et al., "Synthesis of Ag/ZnO nanorods array with enhanced photocatalytic performance", Journal of Hazardous Materials 182, 2010, pp. 123-129.

Yuanhui Zheng et al., "Ag/ZnO Heterostructure Nanocrystals: Synthesis, Characterization, and Photocatalysis", Inorganic Chemistry 2007, 46, pp. 6980-6986.

Yongchun Lui et al., "Surface charge transfer properties of high-performance Ag-decorated ZnO photocatalysts", J. Phys. D: Appl. Phys. 44 (2011) 315502.

Jyh Ming Wu et al., "Ultraviolet-Light-Assisted Formation of ZnO Nanowires in Ambient Air: Comparison of Photoresponsive and Photocatalytic Activities in Zinc Hydroxide", The Journal of Physical Chemistry C Article, 2011, pp. 2235-2243.

Notice of Allowance issued on Jun. 8, 2015 in the corresponding Taiwanese patent application No. 102137866 (4 pages).

Yue, Zhang et al., "China Machine Press, one-dimensional zinc oxide nanomaterials", pp. 372-374.

Yong-Feng Li et al., "China Science Publishing & Media Ltd. (CSPM), modern environmental engineering materials", pp. 270-272.

Chinese Office Action issued on Jan. 8, 2016 for the corresponding application 201310524908.8. pp. 1-18.

\* cited by examiner

PHOTOCATALYST MATERIAL AND METHOD FOR FABRICATING THE SAME

CROSS REFERENCE TO RELATED APPLICATIONS

This application claims the benefit of U.S. Provisional Application No. 61/721,739, filed on Nov. 2, 2012, which provisional application is hereby incorporated herein by reference.

This application claims priority of Taiwan Patent Application No. 102137866, filed on Oct. 21, 2013, the entire contents of which are incorporated herein by reference.

TECHNICAL FIELD

The disclosure relates to a photocatalyst material and a method for fabricating the same.

BACKGROUND

Photocatalysts can be used to improve our living environment and have been gradually accepted by the consumer public. Under visible light or ultraviolet irradiation, active species is produced on the surface of a photocatalyst particle which can oxidize or reduce the pollutants. Photocatalysts have been used extensively for pollutant removal, air cleaning, water purification, odor removal, sterilization, anti-dust and anti-fog purposes.

Nano-size photocatalysts in the form of particles cannot be used directly. The nanoparticles instead must be immobilized on the surface of a certain substrate, e.g. ceramic, glass, wall, metal or some plastic materials.

Currently the methods for immobilizing photocatalyst on the substrate surface include heating a photocatalyst precursor at high-temperature or using silicon dioxide or resin as adhesive agent. The former method involves high temperatures and consumes energy, thereby limiting the uses of the substrate and reducing the adsorption ability thereof; the latter results in reduced activity of nano-sized photocatalyst due to the presence of an adhesive agent, thereby reducing the photocatalytic degradation efficiency.

Therefore, a novel photocatalyst is desired.

BRIEF SUMMARY

According to an embodiment of the disclosure, a photocatalyst material is provided, and the photocatalyst material includes a zinc oxide material doped with metal, wherein the zinc oxide material has a lattice structure including a plurality of defects, and a part of the defects are filled with a metal. Particularly, the lattice structure is constructed of zinc atoms and oxygen atoms.

According to another embodiment of the disclosure, a method for fabricating the above photocatalyst material is provided. The method for fabricating the photocatalyst material includes mixing a zinc-containing organometallic precursor with a metallic precursor to obtain a mixture. Next, the mixture is coated on a substrate and, subjected to an irradiation process to obtain the photocatalyst material.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The disclosure provides a photocatalyst material and a method for fabricating the same.

The photocatalyst material includes a zinc oxide material doped with metal, wherein the zinc oxide material has a lattice structure including a plurality of defects. The defects includes zinc vacancy, oxygen vacancy, or a combination thereof, and a part of the defects are filled with a metal, wherein the metal can be Ag, Cu, Au, Ni, Co, Fe, Pd, Pt, Rh, Ru, or a combination thereof. According to embodiments of the disclosure, the metal can be Ag, or Cu.

In embodiments of the disclosure, the defects filled with metal (such as silver or copper) have a percentage of 5% to 99%, based on the total defects of the lattice structure. According to other embodiments of the disclosure, the defects filled with the metal (such as silver or copper) have a percentage of 40% to 93%, based on the total defects of the lattice structure. According to an embodiment of the disclosure, the ratio of atoms of the metal (such as silver atoms and copper atoms) to the zinc atoms of the zinc oxide material is between 0.00003 and 0.2. According to some embodiments of the disclosure, the ratio of atoms of the metal (such as silver atoms and copper atoms) to the zinc atoms of the zinc oxide material is between 0.0003942 and 0.037. According to the other embodiments of the disclosure, the metal filled into the defect contains a plurality of metallic atoms.

The method for fabricating a photocatalyst material according to an embodiment of the disclosure includes mixing a zinc-containing organometallic precursor with a metallic precursor to obtain a mixture. Next, the mixture is coated on a substrate, and the mixture is subjected to an irradiation process to obtain a photocatalyst material. According to an embodiment of the disclosure, the metallic precursor has a volume percentage between 0.0003 vol % and 5 vol %, based on the total volume of the mixture. Particularly, the light source of the irradiation process can be a visible light source or an ultraviolet light source (with a wavelength of 350-380 nm). The light source can be a light-emitting diode (LED), laser diode (LD), organic light-emitting diode (OLED), cold cathode fluorescent lamp (CCFL), external electrode fluorescent lamp (EEFL), or vacuum ultra violet (VUV). According to some embodiments of the disclosure, the zinc-containing organometallic precursor is a compound, which can be decomposed at low temperature (equal to or less than 300° C.), such as zinc nitrate ($Zn(NO_3)_2$), zinc sulfate ($ZnSO_4$), zinc acetylacetonate (Zn(acac)$_2$, zinc trifluoroacetylacetonate (Zn(tfac)$_2$), zinc acetate (Zn(ac)$_2$), zinc chloride (ZnCl$_2$), zinc bromide (ZnBr$_2$), zinc iodide (ZnI$_2$), zinc sulfamate (Zn(NH$_2$SO$_3$)$_2$), zinc stearate (CH$_3$(CH$_2$)$_{16}$COO)$_2$Zn), zinc oleate (CH$_3$(CH$_2$)$_7$CHCH(CH$_2$)$_7$COO)$_2$Zn), zinc laurate, zinc tertiary-butoxide, zinc hexafluoro acetylacetonate (Zn(hfac)$_2$), or a combination thereof.

Furthermore, the metallic precursor can include Ag-containing precursor, Cu-containing precursor, Au-containing precursor, Ni-containing precursor, Co-containing precursor, Fe-containing precursor, Pd-containing precursor, Pt-containing precursor, Rh-containing precursor, Ru-containing precursor, or a combination thereof. The Ag-containing precursor can include silver 2-ethythexanote (Ag(OOCCH(C$_2$H$_5$)C$_4$H$_9$), silver oxalate (Ag$_2$C$_2$O$_4$), silver decanoate (CH$_3$(CH$_2$)$_8$COOAg), silver stearate (Ag(O$_2$C(CH$_2$)$_{16}$CH$_3$)$_2$), silver cyclohexIbutyrate (C$_6$H$_{11}$(CH$_2$)$_3$CO$_2$Ag), behenic acid silver salt (CH$_3$(CH$_2$)$_{20}$COOAg), silver pentafluoropropionate, silver oxide, silver nitrate, silver acetate, bromotriphenylphosphorane silver, idotriphenylphosphine silver, or a combination thereof. The Cu-containing precursor can include copper(I) formate, copper(II) formate, copper(I) acetate, copper octanoate (CH$_3$(CH$_2$)$_6$COOCu), copper(II) acetate, copper(I) cyanide, copper(II) cyanide, copper(II) oleate, copper thiocyanide, or a combination thereof.

According to an embodiment of the disclosure, during the subjecting of the mixture to the irradiation process, the mixture is subjected to a thermal treatment simultaneously. Particularly, the process temperature of the thermal treatment can be less than 300□ (such as 100-300° C., 200-300° C., or 250-300° C.), and the period of the thermal treatment can be between 1-120 min.

Figure 1:
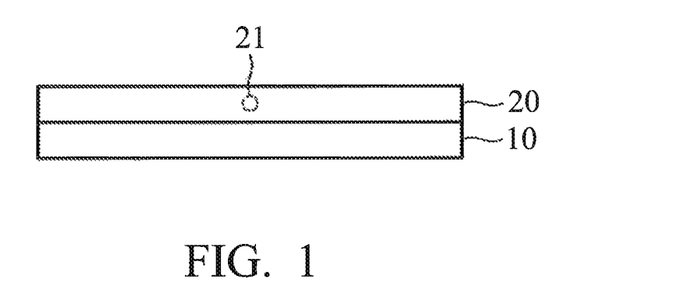
FIG. 1 is a cross-section illustrating a photocatalyst material according to an embodiment of the disclosure formed on a substrate.
Figure 2:
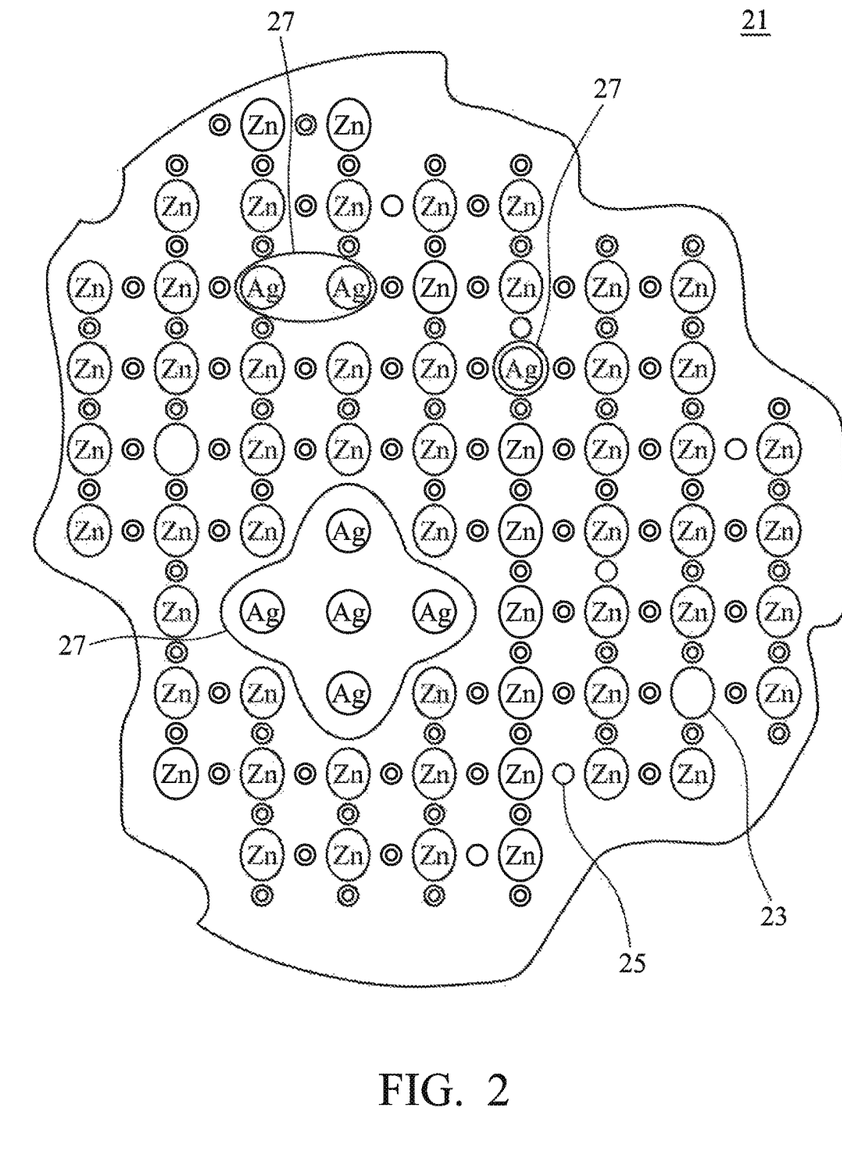
FIG. 2 is a close-up diagram of region 21 of the lattice structure of the photocatalyst material shown in FIG. 1.

FIG. 1 is a cross-section illustrating a photocatalyst material (such as a zinc oxide material 20 with silver filled into the defects thereof) according to an embodiment of the disclosure formed on a substrate 10. FIG. 2 is a close-up diagram of region 21 of the lattice structure of the photocatalyst material shown in FIG. 1. As shown in FIG. 2, zinc atoms Zn are disposed between the oxygen atoms O, and the lattice structure has a plurality of zinc vacancies 23 and oxygen vacancy 25. Particularly, the lattice structure has a plurality of defects 27, which is constructed from zinc vacancy, oxygen vacancy, or a combination thereof. Further, a part of the defects 27 are filled with a silver atom Ag (or several silver atoms Ag).

The following examples are intended to illustrate the disclosure more fully without limiting its scope, since numerous modifications and variations will be apparent to those skilled in this art.

Preparation of Photocat Aterial

Example 1

0.4 g of zinc acetylacetonate (Zn(acac)$_2$) and 2 ml of denatured alcohol (86% of dehydrated alcohol, 13% of methanol, 1% of ethyl acetate) were mixed to obtain a zinc-containing organometallic precursor solution. Next, silver decanoate (CH$_3$(CH$_2$)$_8$COOAg) was dissolved in dimethylbenzene to obtain a silver metallic precursor solution (with 0.1 wt % of silver decanoate). Next, 210 ml of zinc-containing organometallic precursor solution was mixed with 10 ml of silver metallic precursor solution to obtain a mixture, wherein the metallic precursor (silver decanoate) had a volume percentage of 0.0039 vol % (based on the volume of the mixture).

Next, the mixture was coated on a glass substrate by spinning coating to form a coating. Next, the coating was irradiated by an ultraviolet light source for 5 min, obtaining a zinc oxide doped with silver atoms (1).

Example 2

0.4 g of zinc acetylacetonate (Zn(acac)$_2$) and 2 ml of denatured alcohol (86% of dehydrated alcohol, 13% of methanol, 1% of ethyl acetate) were mixed to obtain a zinc-containing organometallic precursor solution. Next, silver decanoate (CH$_3$(CH$_2$)$_8$COOAg) was dissolved in dimethylbenzene to obtain a silver metallic precursor solution (with 0.2 wt % of silver decanoate). Next, 210 ml of zinc-containing organometallic precursor solution was mixed with 10 ml of silver metallic precursor solution to obtain a mixture, wherein the metallic precursor (silver decanoate) had a volume percentage of 0.0078 vol % (based on the volume of the mixture).

Next, the mixture was coated on a glass substrate by spinning coating to form a coating. Next, the coating was irradiated by an ultraviolet light source for 5 min, obtaining a zinc oxide material doped with silver atoms (2).

Example 3

0.4 g of zinc acetylacetonate (Zn(acac)$_2$) and 2 ml of denatured alcohol (86% of dehydrated alcohol, 13% of methanol, 1% of ethyl acetate) were mixed to obtain a zinc-containing organometallic precursor solution. Next, silver decanoate (CH$_3$(CH$_2$)$_8$COOAg) was dissolved in dimethylbenzene to obtain a silver metallic precursor solution (with 0.5 wt % of silver decanoate). Next, 210 ml of zinc-containing organometallic precursor solution was mixed with 10 ml of silver metallic precursor solution to obtain a mixture, wherein the metallic precursor (silver decanoate) had a volume percentage of 0.0196 vol % (based on the volume of the mixture).

Next, the mixture was coated on a glass substrate by spinning coating to form a coating. Next, the coating was irradiated by an ultraviolet light source and heated by an electro-thermal process for 5 min after heating to 200° C. (with a heating rate of 5° C./min), obtaining a zinc oxide material doped with silver atoms (3). Next, the zinc oxide material doped with silver atoms (3) was analyzed by X-ray energy dispersive spectrometer (EDS), and the result showed that the ratio between silver atoms and zinc atoms was 0.00175.

Example 4

0.4 g of zinc acetylacetonate (Zn(acac)$_2$) and 2 ml of denatured alcohol (86% of dehydrated alcohol, 13% of methanol, 1% of ethyl acetate) were mixed to obtain a zinc-containing organometallic precursor solution. Next, silver decanoate (CH$_3$(CH$_2$)$_8$COOAg) was dissolved in dimethylbenzene to obtain a silver metallic precursor solution (with 1 wt % of silver decanoate). Next, 210 ml of zinc-containing organometallic precursor solution was mixed with 10 ml of silver metallic precursor solution to obtain a mixture, wherein the metallic precursor (silver decarioate) had a volume percentage of 0.0392 vol % (based on the volume of the mixture).

Next, the mixture was coated on a glass substrate by spinning coating to form a coating. Next, the coating was irradiated by an ultraviolet light source and heated by an electro-thermal process for 5 min after heating to 200° C. (with a heating rate of 5° C./min), obtaining a zinc oxide material doped with silver atoms (4). Next, the zinc oxide material doped with silver atoms (4) was analyzed by X-ray energy dispersive spectrometer (EDS), and the result showed that the ratio between silver atoms and zinc atoms was 0.00297.

Example 5

0.4 g of zinc acetylacetonate ($Zn(acac)_2$) and 2 ml of denatured alcohol (86% of dehydrated alcohol, 13% of methanol, 1% of ethyl acetate) were mixed to obtain a zinc-containing organometallic precursor solution. Next, silver decanoate ($CH_3(CH_2)_8COOAg$) was dissolved in dimethylbenzene to obtain a silver metallic precursor solution (with 2 wt % of silver decanoate). Next, 210 ml of zinc-containing organometallic precursor solution was mixed with 10 ml of silver metallic precursor solution to obtain a mixture, wherein the metallic precursor (silver decanoate) had a volume percentage of 0.0785 vol % (based on the volume of the mixture).

Next, the mixture was coated on a glass substrate by spinning coating to form a coating. Next, the coating was irradiated by an ultraviolet light source and heated by an electro-thermal process for 5 min after heating to 200° C. (with a heating rate of 5° C./min), obtaining a zinc oxide material doped with silver atoms (5). Next, the zinc oxide material doped with silver atoms (5) was analyzed by X-ray energy dispersive spectrometer (EDS), and the result showed that the ration between silver atoms and zinc atoms was 0.00573.

Example 6

0.4 g of zinc acetylacetonate ($Zn(acac)_2$) and 2 ml of denatured alcohol (86% of dehydrated alcohol, 13% of methanol, 1% of ethyl acetate) were mixed to obtain a zinc-containing organometallic precursor solution. Next, silver decanoate ($CH_3(CH_2)_8COOAg$) was dissolved in dimethylbenzene to obtain a silver metallic precursor solution (with 5 wt % of silver decanoate). Next, 210 ml of zinc-containing organometallic precursor solution was mixed with 10 ml of silver metallic precursor solution to obtain a mixture, wherein the metallic precursor (silver decanoate) had a volume percentage of 0.197 vol %, (based on the volume of the mixture).

Next, the mixture was coated on a glass substrate by spinning coating to form a coating. Next, the coating was irradiated by an ultraviolet light source and heated by an electro-thermal process for 5 min after heating to 200° C. (with a heating rate of 5° C./min), obtaining a zinc oxide material doped with silver atoms (6). Next, the zinc oxide material doped with silver atoms (6) was analyzed by X-ray energy dispersive spectrometer (EDS), and the result showed that the ratio between silver atoms and zinc atoms was 0.01226.

Example 7

0.4 g of zinc acetylacetonate ($Zn(acac)_2$) and 2 ml of denatured alcohol (86% of dehydrated alcohol, 13% of methanol, 1% of ethyl acetate) were mixed to obtain a zinc-containing organometallic precursor solution. Next, silver decanoate ($CH_3(CH_2)_8COOAg$) was dissolved in dimethylbenzene to obtain a silver metallic precursor solution (with 10 wt % of silver decanoate). Next, 210 ml of zinc-containing organometallic precursor solution was mixed with 10 ml of silver metallic precursor solution to obtain a mixture, wherein the metallic precursor (silver decanoate) had a volume percentage of 0.3969 vol % (based on the volume of the mixture).

Next, the mixture was coated on a glass substrate by spinning coating to form a coating. Next, the coating was irradiated by an ultraviolet light source and heated by an electro-thermal process for 5 min after heating to 200° C. (with a heating rate of 5° C./min), obtaining a zinc oxide material doped with silver atoms (7). Next, the zinc oxide doped with silver atoms (7) was analyzed by X-ray energy dispersive spectrometer (EDS), and the result showed that the ratio between silver atoms and zinc atoms was 0.03727.

Example 8

0.4 g of zinc acetylacetonate ($Zn(acac)_2$) and 2 ml of denatured alcohol (86% of dehydrated alcohol, 13% of methanol, 1% of ethyl acetate) were mixed to obtain a zinc-containing organometallic precursor solution. Next, copper octanoate ($CH_3(CH_2)_6COOCu$) was dissolved in dimethylbenzene to obtain a copper metallic precursor solution (with 5 wt % of copper octanoate). Next, 210 ml of zinc-containing organometallic precursor solution was mixed with 10 ml of copper metallic precursor solution to obtain a mixture, wherein the metallic precursor (copper octanoate) had a volume percentage of 0.197 vol % (based on the volume of the mixture).

Next, the mixture was coated on a glass substrate by spinning coating to form a coating. Next, the coating was irradiated by an ultraviolet light source for 5 min, obtaining a zinc oxide material doped with copper atoms(8).

Figure 3:
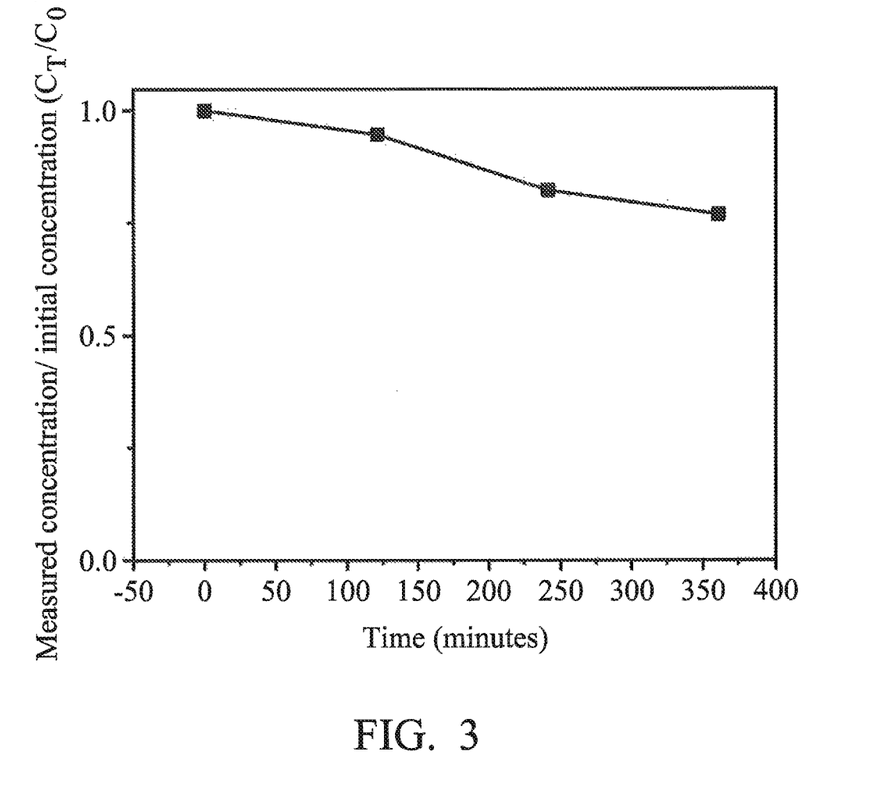
FIG. 3 shows a graph plotting methyl orange concentration against time of the photocatalyst material of Example 8 used for decomposing methyl orange.

FIG. 3 shows a graph plotting methyl orange concentration against time of the photocatalyst of Example 8 used for decomposing methyl orange.

Comparative Example 1

0.4 g of zinc acetylacetonate ($Zn(acac)_2$) and 2 ml of denatured alcohol (86% of dehydrated alcohol, 13% of methanol, 1% of ethyl acetate) were mixed to obtain a mixture after polishing, wherein the mixture did not include copper or silver precursor.

Next, the mixture was coated on a glass substrate by spinning coating to form a coating. Next, the coating was irradiated by an ultraviolet light source and heated by an electrothermal process for 5 min after heating to 200° C. (with a heating rate of 5° C./min), obtaining a zinc oxide material doped with silver atoms (9).

Figure 4:
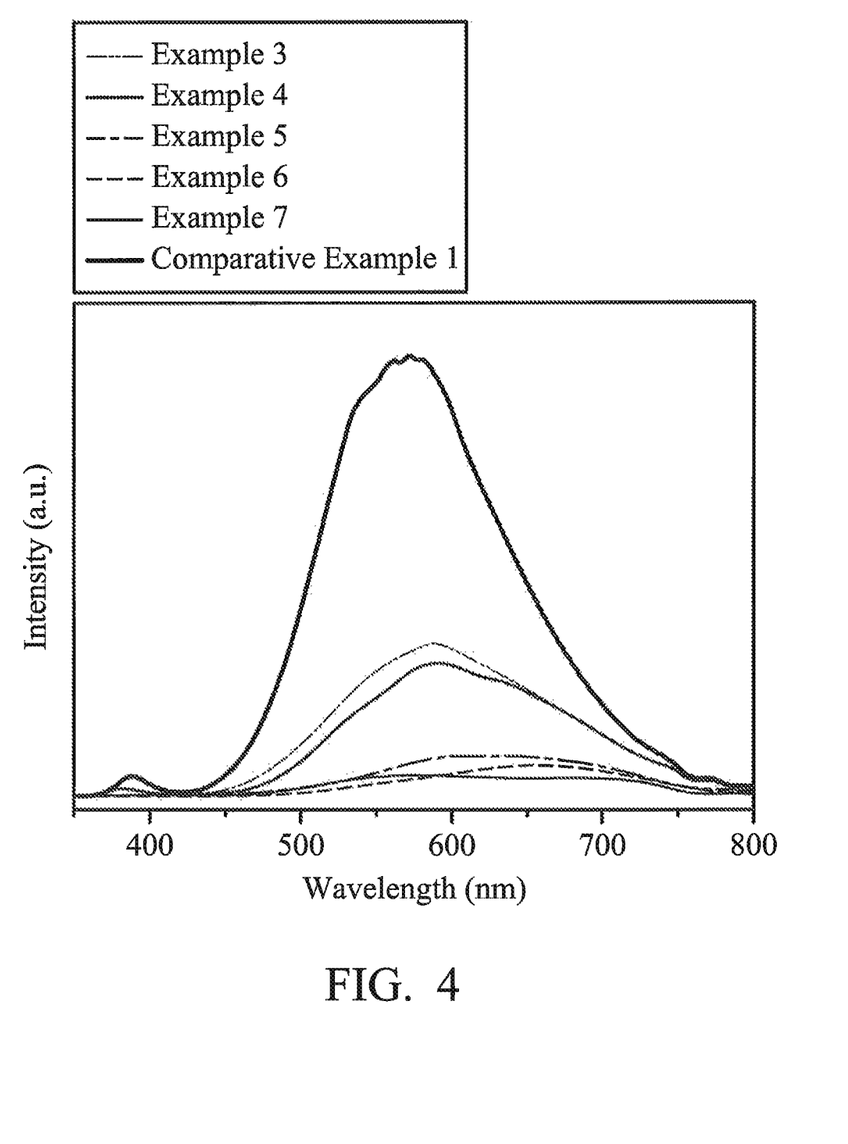
FIG. 4 shows photoluminescence excitation spectra of the photocatalyst materials (3)-(7) and (9) as disclosed in Examples 3-7 and Comparative Example 1.

The photocatalyst materials (3)-(7) and (9) as disclosed in Examples 3-7 and Comparative Example 1 were characterized by an excitation spectroscopy, and the photoluminescence excitation spectra thereof are shown in FIG. 4.

As shown in FIG. 4, the photocatalyst material (9) shows a relatively high excitation intensity, where the photocatalyst material (9) did not include silver or copper. On the other hand, the photocatalyst materials (3)-(7) of the disclosure show a relatively low excitation intensity, since the silver is filled into the defeats of the lattice structure of the zinc oxide material. With the increase of the silver precursor, there arc more silver atoms filled into the defects of the lattice structure, thereby reducing the excitation intensity of the zinc oxide materials. As shown in FIG. 4, in the photocatalyst materials (3)-(7), the defects filled with the metal has a percentage of 58% to 93% (measured by integrating the photoluminescence excitation spectra), based on the total defects of the lattice structure.

As shown in FIG. 4, the defects of the lattice structure excited by an excitation light emit a light with wavelength of between 450 nm and 800 nm. With the increase of sliver atoms filled in the defects, the excitation intensities of the photocatalyst materials (3)-(7) are decreased obviously. Hence, FIG. 4 evidences that the unoccupied defects of the photocatalyst material of the disclosure are decreased in comparison with the photocatalyst material (9).

The photocatalyst materials (3)-(7) and (9) as disclosed in Examples 3-7 and Comparative Example 1 and the commercially available photocatalyst material are characterized by an absorption spectroscopy, and the absorption intensities (within the wavelength range between 200 nm and 800 nm) thereof are determined.

Figure 5:
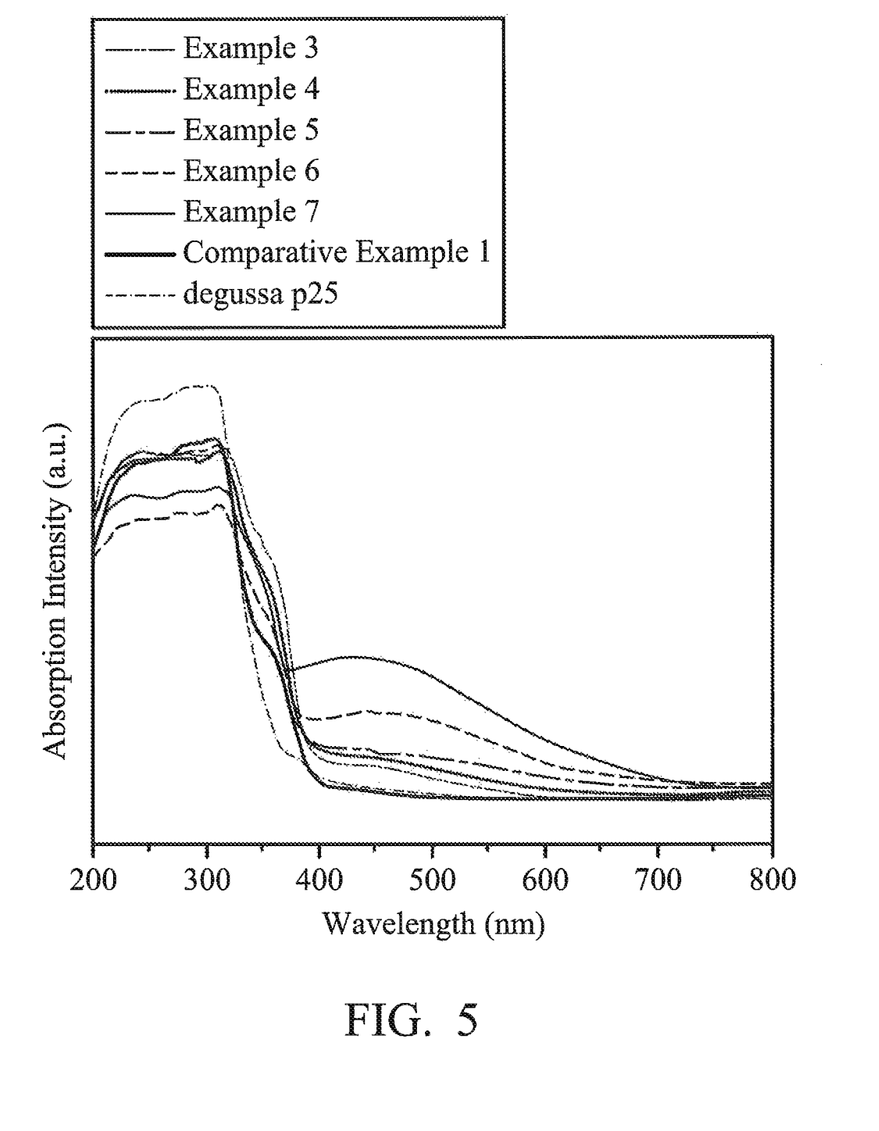
FIG. 5 shows wavelength absorption spectra of the photocatalyst materials (3)-(7) and (9) as disclosed in Examples 3-7, Comparative Example 1 and the commercially available photocatalyst material.

As shown in FIG. 5, the photocatalyst materials (3)-(7) of the disclosure exhibits high absorption intensity within, the visible and ultraviolet range, since the defects of the photocatalyst materials are filled with silver atoms. Therefore, the photocatalyst materials of the disclosure can be used widely in a variety of applications.

Figure 6:
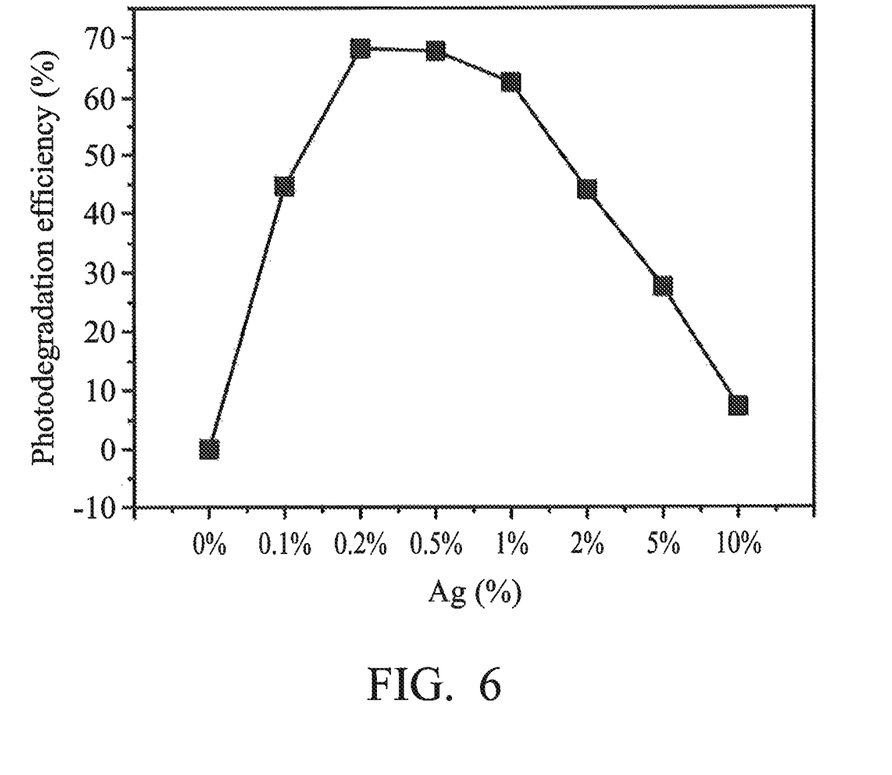
FIG. 6 shows a graph plotting silver concentration against photodegradation efficiency of the photocatalyst materials of the disclosure.

Next, the photocatalyst materials (3)-(7) and (9) as disclosed in Examples 3-7 are subjected to a photodegradation efficiency measurement process. The photodegradation efficiency (determined by a formula of $(1-(C(T)/C(0))\times 100\%)$, wherein $C(T)$) indicates the measured concentration, and $C(0)$ indicates the initial concentration) of photocatalyst materials are characterized at the sixth hour of the measurement process, and the results are shown in FIG. 6.

Accordingly, the photocatalyst material and the method for fabricating the same of the disclosure have the advantages of simplified preparation process, reduced cost, and short processing time. Furthermore, the photocatalyst material of the disclosure has a stable lattice structure, thereby increasing the range of absorption wavelength thereof and improving the photodegradation efficiency thereof.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A photocatalyst material, comprising:
a zinc oxide material doped with metal, wherein the zinc oxide material has a lattice structure comprising a plurality of defects comprising zinc vacancy and oxygen vacancy, and a part of the defects are filled with a metal.

2. The photocatalyst material as claimed in claim 1, wherein the lattice structure is constructed by zinc atoms and oxygen atoms.

3. The photocatalyst material as claimed in claim 1, wherein the metal filled into the defect is a single metallic atom.

4. The photocatalyst material as claimed in claim 1, wherein the metal filled into the defect contains a plurality of metallic atoms.

5. The photocatalyst material as claimed in claim 1, wherein the metal is Ag, Cu, Au, Ni, Co, Fe, Pd, Pt, Rh, Ru, or a combination thereof.

6. The photocatalyst material as claimed in claim 1, wherein the defects filled with the metal has a percentage of 5% to 99%, based on the total defects of the lattice structure.

7. The photocatalyst material as claimed in claim 1, wherein the defects filled with the metal has a percentage of 40% to 93%, based on the total defects of the lattice structure.

8. The photocatalyst material as claimed in claim 2, wherein the ratio between atoms of the metal and the zinc atoms of the zinc oxide material is between 0.00003 and 0.2.

9. The photocatalyst material as claimed in claim 2, wherein the ratio between atoms of the metal and the zinc atoms of the zinc oxide material is between 0.0003942 and 0.037.

10. A method for fabricating a photocatalyst material of claim 1, comprising:
mixing a zinc-containing organometallic precursor with a metallic precursor to obtain a mixture; and
subjecting the mixture to an irradiation process to obtain a photocatalyst material.

11. The method for fabricating a photocatalyst material as claimed in claim 10, wherein the zinc-containing organometallic precursor comprises zinc nitrate ($Zn(NO_3)_2$), zinc sulfate ($ZnSO_4$), zinc acetylacetonate ($Zn(acac)_2$), zinc trifluoroacetylacetonate ($Zn(tfac)_2$), zinc acetate ($Zn(ac)_2$), zinc chloride ($ZnCl_2$), zinc bromide ($ZnBr_2$), zinc iodide ($ZnI_2$), zinc sulfamate ($Zn(NH_2SO_3)_2$), zinc stearate ($CH_3(CH_2)_{16}COO)_2Zn$), zinc oleate ($CH_3(CH_2)_7CHCH(CH_2)_7COO)_2Zn$), zinc laurate, zinc tertiary-butoxide, zinc hexafluoro acetylacetonate ($Zn(hfac)_2$), or a combination thereof.

12. The method for fabricating a photocatalyst material as claimed in claim 10, wherein the metallic precursor is Ag-containing precursor, Cu-containing precursor, Au-containing precursor, Ni-containing precursor, Co-containing precursor, Fe-containing precursor, Pd-containing precursor, Pt-containing precursor, Rh-containing precursor, Ru-containing precursor, or a combination thereof.

13. The method for fabricating a photocatalyst material as claimed in claim 12, wherein the Ag-containing precursor is silver 2-ethylhexanote ($Ag(OOCCH(C_2H_5)C_4H_9)$), silver oxalate ($Ag_2C_2O_4$), silver decanoate ($CH_3(CH_2)_8COOAg$), silver stearate ($Ag(O_2C(CH2)_{16}CH_3)_2$), silver cyclohexlbutyrate ($C_6H_{11}(CH_2)_3CO_2Ag$), behenic acid silver salt ($CH_3(CH_2)_{20}COOAg$), silver pentafluoropropionate, silver oxide, silver nitrate, silver acetate, bromotriphenylphosphorane silver, idotriphenylphosphine silver, or a combination thereof.

14. The method for fabricating a photocatalyst material as claimed in claim 12, wherein the Cu-containing precursor is copper(I) formate, copper(II) formate, copper(I) acetate, copper octanoate (CH3(CH2)6COOCu), copper(II) acetate, copper(I) cyanide, copper(II) cyanide, copper(II) oleate, copper thiocyanide, or a combination thereof.

15. The method for fabricating a photocatalyst material as claimed in claim 10, wherein the mixture is subjected to a thermal treatment simultaneously during the irradiation process.

16. The method for fabricating a photocatalyst material as claimed in claim 15, wherein the process temperature of the thermal treatment is less than 300° C.

17. The method for fabricating a photocatalyst material as claimed in claim 10, wherein the metallic precursor has a volume percentage of between 0.0003 vol % and 5 vol %, based on the volume of the mixture.

* * * * *